(12) United States Patent
Noyes

(10) Patent No.: US 8,737,746 B2
(45) Date of Patent: May 27, 2014

(54) METHOD FOR MULTIPLE PASS SYMBOL AND COMPONENTS-BASED VISUAL OBJECT SEARCHING OF DOCUMENTS

(75) Inventor: Peter Noyes, Sunland, CA (US)

(73) Assignee: Bluebeam Software, Inc.

( * ) Notice: Subject to any disclaimer, the term of this patent is extended or adjusted under 35 U.S.C. 154(b) by 106 days.

(21) Appl. No.: 13/018,299

(22) Filed: Jan. 31, 2011

(65) Prior Publication Data

US 2012/0195508 A1    Aug. 2, 2012

(51) Int. Cl.
    *G06K 9/68*       (2006.01)
(52) U.S. Cl.
    USPC ........... 382/218; 382/103; 382/107; 382/228; 382/299; 382/209; 382/274; 382/141; 382/216
(58) Field of Classification Search
    CPC .................................................. G06F 17/30277
    USPC ......... 382/218, 103, 107, 228, 299, 209, 274, 382/141, 216
See application file for complete search history.

(56) References Cited

U.S. PATENT DOCUMENTS

| | | | |
|---|---|---|---|
| 5,159,667 A | 10/1992 | Borrey et al. | |
| 6,522,782 B2 | 2/2003 | Pass et al. | |
| 6,584,223 B1 | 6/2003 | Shiiyama | |
| 6,826,305 B2 | 11/2004 | Zhu | |
| 7,035,483 B2 | 4/2006 | Yamashiro et al. | |
| 7,302,084 B2 | 11/2007 | Szeliski et al. | |
| 7,374,077 B2 | 5/2008 | Shimura | |
| 2003/0108237 A1 | 6/2003 | Hirata | |
| 2006/0036577 A1 | 2/2006 | Knighton et al. | |
| 2010/0054593 A1 | 3/2010 | Matsushita et al. | |
| 2010/0260426 A1 | 10/2010 | Huang et al. | |

OTHER PUBLICATIONS

PCT International Search Report, Mar. 21, 2012.

*Primary Examiner* — Mike Rahmjoo
(74) *Attorney, Agent, or Firm* — Stetina Brunda Garred & Brucker

(57) ABSTRACT

A method of computerized searching for visual objects on an electronic document is disclosed. After receiving a selection of a template visual object, a template raster image is generated therefrom. The template visual object is comprised of one or more template object components. A document raster image is generated from the document, which includes document object symbols comprised of one or more document object components. A broad match candidate subset of document object symbols is generated based upon comparisons to the template object symbol. Then, a narrowed match candidate set is generated from those document object symbols of the broad match candidate subset based upon a comparison of the template object component to the document object components.

20 Claims, 7 Drawing Sheets

METHOD FOR MULTIPLE PASS SYMBOL AND COMPONENTS-BASED VISUAL OBJECT SEARCHING OF DOCUMENTS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure generally relates to computerized searching, and more particularly, to methods for multiple pass symbol and components-based visual object searching of electronic documents.

2. Related Art

The creation, distribution, and management of information are core functions of business. Information or content can be presented in a variety of different ways, including word processing documents, spreadsheets, graphics, photographs, engineering drawings, architectural plans, and so forth. In electronic form, these are generally referred to as documents, and may be generated and manipulated by computer software applications that are specific thereto. A typical workflow in the enterprise involves various personnel, oftentimes across disparate geographic locations, collaborating to create, review, and/or edit such documents.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

One of the significant advantages of working with electronic documents such as those in the PDF format is the ability to search a large volume of information in a short period of time. With non-electronic or paper documents, searching for an item of information, even with the best of cataloging and other indexing tools, proved to be an arduous and painstaking process. In general, the searching of conventional electronic documents has been limited to text-based methods, where the user enters a simple word query and the locations where that queried word or words are found are identified. Additional search parameters such as formatting can also be specified. Boolean and natural language searching techniques are also known, though typically utilized for searching across databases of documents, web pages on the World Wide Web, and so forth. Ultimately, however, these involve text-based queries.

The information/subject matter stored in and exchanged as PDF files is becoming increasingly complex, and a wide range of documents are being digitized as part of the trend toward paperless offices. Indeed, engineering diagrams, construction plans, wiring diagrams, and so forth are oftentimes saved in, and shared via, PDF documents. With the increasing use of graphics in documents, particularly in those types listed above, querying for such elements is a desirable feature. For example, construction drawings contain various symbols that variously provide pertinent reference information to the viewer not immediately apparent from the drawings, link to other parts of the drawing or the document, and so forth. Such links associated with the symbols may be made active, or a count of a particular symbol may be necessary. Presently, this is performed manually, which is extremely time-consuming.

Rather than searching the contents of the graphics itself, another conventional technique involves associating metadata with the graphic and using a text-based search thereof. A variety of information can be specified in the metadata, such as subject matter or content keywords, category keywords, location keywords, and so forth. In a catalog of different images or graphics, such text metadata searching may be adequate. But cataloging every graphic in a large document may not be possible, particularly if the document data structure is not accommodating thereof.

Accordingly, there is a need in the art for multiple pass symbol and components-based visual object searching of electronic documents.

BRIEF SUMMARY

In accordance with various embodiments of the present disclosure, a method of computerized searching for visual objects on an electronic document is contemplated. The method may begin with receiving a selection of a template visual object. There may also be a step of generating a template raster image from the template visual object. The template raster image may include a set of one or more connected sequences of adjacent pixels. Additionally, the method may include deriving a template object symbol from the template raster image. The template object symbol may be comprised of one or more template object components that each correspond to a respective one of the connected sequences of adjacent pixels of the template raster image. The template object components may be representative of a subsection of the template raster image. The method may also include generating a document raster image from the document. The document raster image may include sets of one or more connected sequences of adjacent pixels. Each of the sets may correspond to a document object symbol and each of the connected sequences of adjacent pixels therein may correspond to a document object component. A step of generating a broad match candidate subset of document object symbols from the derived overall set may be included. This broad match candidate subset may be based upon a comparison of the template object symbol to the document raster image. The method may also include generating a narrowed match candidate set of document object symbols from the broad match candidate subset based upon a comparison of the template object components to the document object components. The document object components may be those of the document object symbols that are members of the broad match candidate subset. The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the computerized searching method, and is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
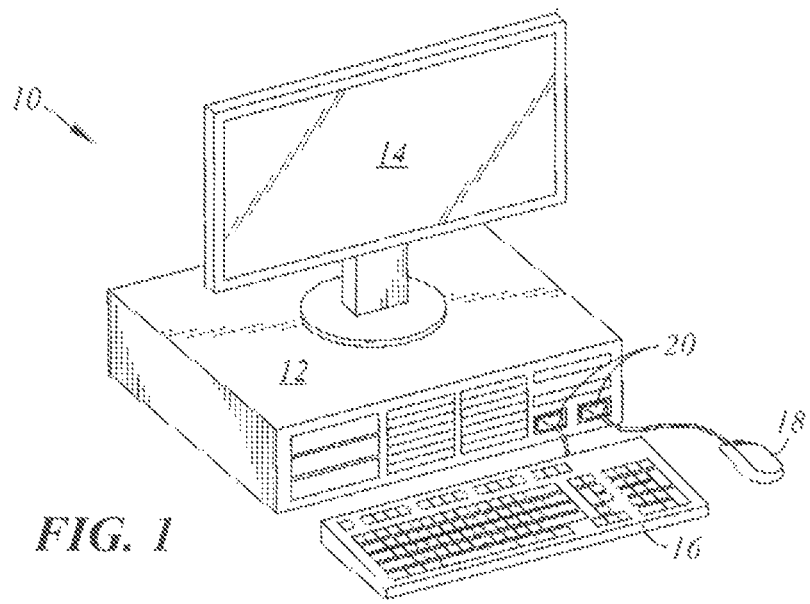
FIG. 1 is an exemplary computer system that may be capable to perform functions for use with aspects of the present invention including a display monitor.

FIG. 1 depicts an exemplary hardware environment in which various aspects of the contemplated method of computerized searching for visual objects on an electronic document may be implemented. Generally, there is a computer system 10 with a system unit 12 and a display monitor 14. The display monitor 14 graphically displays output from the data processing operations performed by the system unit 12. The display monitor 14 is a visual output device and includes some form of a screen. The display monitor 14 may be of a Liquid Crystal Display (LCD) type, a Cathode Ray Tube (CRT) type, or any other suitable type of display. Input devices such as a keyboard 16 and a mouse 18 are manipulable by a user to generate corresponding inputs to the data processing operations, and are connected to the system unit 12 via USB ports 20. Various other input and output devices may be connected to the system unit 12, and alternative interconnection modalities may be substituted with the USB ports 20.

Figure 2:
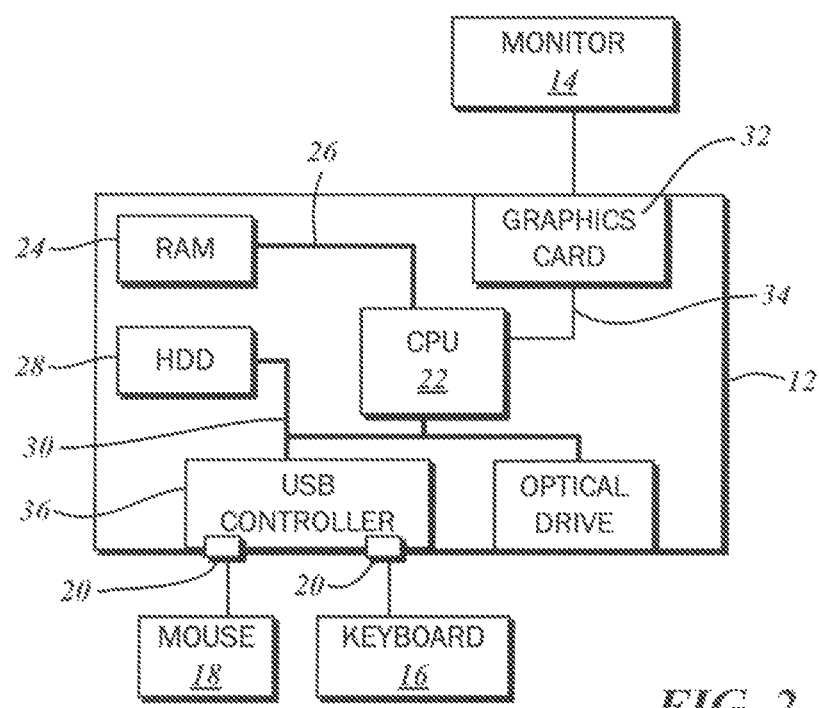
FIG. 2 is a block diagram of system components of the exemplary computer system of FIG. 1.

As shown in the block diagram of FIG. 2, the system unit 12 includes a Central Processing Unit (CPU) 22, which may represent one or more conventional types of such processors, such as an IBM PowerPC, Intel Pentium (x86) processors, and so forth. A Random Access Memory (RAM) 24 temporarily stores results of the data processing operations performed by the CPU 22, and is interconnected thereto typically via a dedicated memory channel 26. The system unit 12 may also include permanent storage devices such as a hard drive 28, which are also in communication with the CPU 22 over an input/output (I/O) bus 30. Other types of storage devices such as tape drives, Compact Disc drives, and the like may also be connected. A graphics device 32 is also connected to the CPU 22 via a video bus 34, and transmits signals representative of display data to the display monitor 14. As indicated above, the keyboard 16 and the mouse 18 are connected to the system unit 12 over the USB port 20. A USB controller 36 translates data and instructions to and from the CPU 22 for external peripherals connected to the USB port 20. Additional devices such as printers, microphones, speakers, and the like may be connected to the system unit 12.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display monitor 14. Generally, the operating system and the computer programs are tangibly embodied in a computer-readable medium, e.g. one or more of the fixed and/or removable data storage devices including the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with the computer system 10, specifically with the graphics being generated on the display monitor 14, via the mouse 18. The movement of a cursor generated on the display monitor 14 is tied to the movement of the mouse 18, with further interactivity being provided with input from the mouse buttons. Input from the keyboard 16 also provides interactivity with the computer system 10. The following description refers to "clicking" the mouse buttons, "positioning" the cursor, "holding" the mouse button to "drag" an on-screen object, and so forth. It will be appreciated by those having ordinary skill in the art that such terms have well-understood meanings relative to interactions with the computer system 10 through a graphical user interface, and also find correspondence to other input modalities such as pen/digitizers and the like.

The foregoing computer system 10 represents only one exemplary apparatus suitable for implementing aspects of the present invention. As such, the computer system 10 may have many different configurations and architectures. Any such configuration or architecture may be readily substituted.

Figure 3:
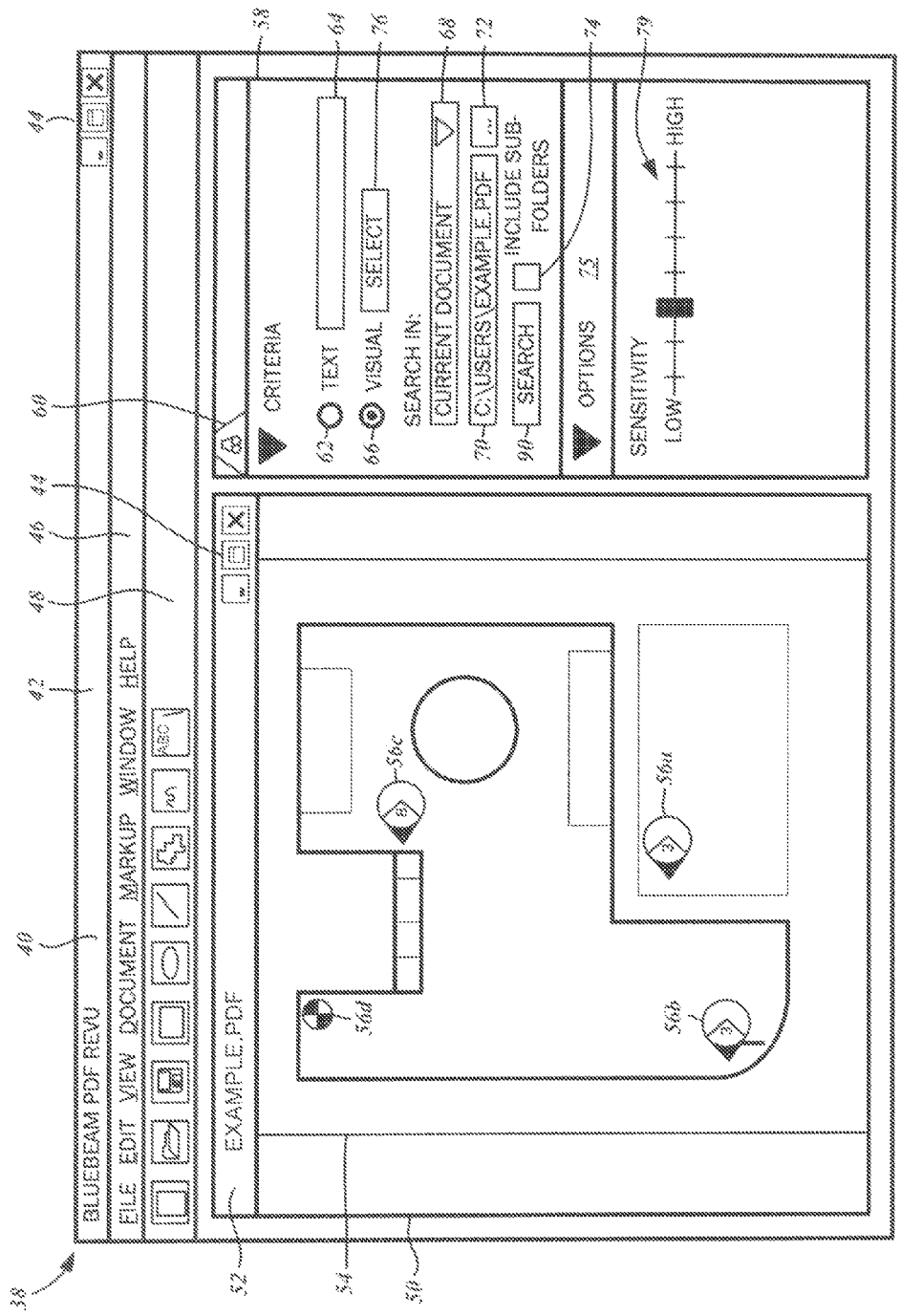
FIG. 3 is an exemplary user interface of a document editing software application that implements various aspects of the contemplated method of computerized searching for visual objects.

Referring now to FIG. 3, there is shown an exemplary graphical user interface 38 of a document editing software application in which various embodiments of the method of computerized searching may be implemented. As utilized herein, the term document refers to an electronic file or standalone representation of data that can be opened, rendered and/or edited by the corresponding document editing software application. Accordingly, the document may be formatted and structured in a particular way so that its elements can be rendered consistently. In the exemplary embodiment discussed herein, the document reviewing software application handles PDF documents, and the following description of the computerizing searching method will be in relation thereto. However, it will be appreciated by those having ordinary skill in the art that documents in any other format that are editable with any other software application may be substituted. The software application runs on a windowing system, and accordingly has a number of interface elements that are common to applications for the same.

In further detail, the functional, interactive features of the graphical user interface 38 are contained within a main window 40 that includes a title bar 42 with basic window controls 44 that variously minimize, maximize, and close the main window 40. In addition, the main window 40 includes a menu bar 46, from which various functions of the document editing software application may be invoked via activated pull-down menus. So that commonly utilized functions such as opening files, saving changes to the currently opened file, and so forth are readily accessible, there is also a tool bar 48. Within the main window 40 is a workspace window 50, which includes a sub-title bar 52 with the name of the opened document file, "example.pdf," and the basic window controls 44. There is a document 54 that is rendered within the workspace window 50. In the example shown, the document 54 is an architectural drawing comprised of various graphical elements including lines and arcs.

As part of the drawing, or appended to the document 54 as an annotation, there may be several overlaid visual objects 56. In particular, there is a first visual object 56a, a second visual object 56b, a third visual object 56c, and a fourth visual object 56d. The first, second and third visual objects 56a-c are generally comprised of a circle, a pair of radial lines, and an arrow appended to a side portion of the circle. Within the pair of radial lines is a numerical value. The fourth visual object 56d is a circle with a checkered pattern inside. The visual objects 56 are understood to provide additional information, such as pointers to other views, notes, and so forth. In this regard, the visual objects 56 are placed in specific locations of the document 54. Thus, each of the visual objects has an associated position value that corresponds to such locations. The position values are understood to be relative to coordinates that are referenced to the document 54. Various embodiments of the present disclosure contemplate the identification of these visual objects 56 within the document 54 based upon search parameters. It will be recognized that the specific appearance and content of the visual objects 56 are presented by way of example only, and there are numerous other types of visual objects 56 that may be included on the document 54.

The main window 40 also includes a tool panel window 58 that is positioned to the right of the workspace window 50. A search function is contemplated in accordance with one embodiment of the software application, and so the tool panel window 58 has a tab 60 specific thereto, as indicated by an icon depicting a pair of binoculars. Other functions may be accessible via different tabs, but for the sake of brevity, such other tabs are not shown. As with conventional document editing software applications, a text-based search is possible. Selecting a first radio button 62 activates such text-based searching features, and the text for which the document 54 is searched is entered into a text box 64. Selecting a second radio button 66 invokes a visual object-based search as will be described in further detail below.

With the selection of either the first radio button 62 (text-based search) or the second radio button 66 (visual object-based search), additional search parameters may be specified. A first pull-down menu 68 allows a selection of the document(s) to search. FIG. 3 illustrates this parameter as being set to the current document, which limits the search to the document currently being edited in the workspace window 50. It is contemplated that multiple documents can be opened in the software application at once, so another setting of this parameter can be set to all open documents.

Beyond the files opened in the software application, there is also an option to search for multiple documents stored in the file system. In the pull-down menu 68, this option may be referenced as "Folder." The top-level directory that is to be searched is specified in path entry text box 70. As implemented in other graphical user interfaces, there is a file system browser button 72 that invokes a dialog box for visually navigating the file system. A checkbox 74 specifies whether sub-directories of the selected top-level directory that is to be searched. The path entry text box 70 and the checkbox 74 are understood to be active when the option to search for multiple documents is selected, that is, when the first pull-down menu 68 is set to "Folder." At other times, the path entry text box 70, the file system browser button 72, the checkbox 74, and its associated descriptive text may be dimmed and rendered inactive.

Although the methods of computerized searching refer to searching one document, it is understood that the method is applicable to searching multiple documents as well. Such multiple document searching can be invoked by setting the parameters therefor as described above.

Figure 4:
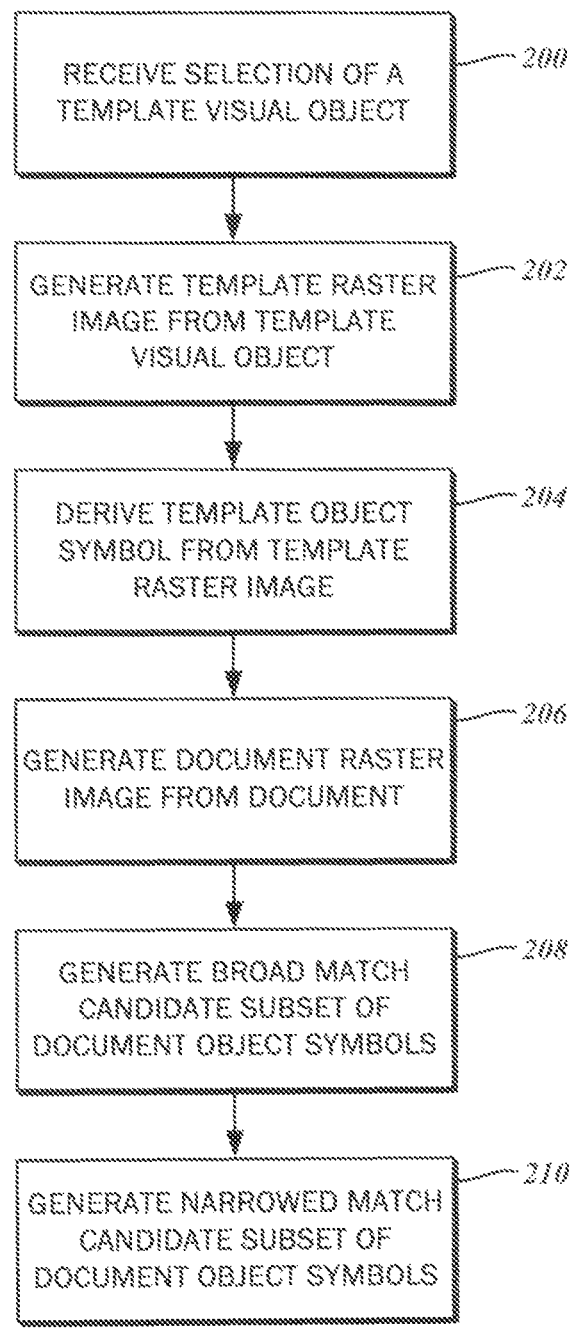
FIG. 4 is a flowchart illustrating the method of computerized searching for visual objects in accordance with one embodiment of the present disclosure.
Figure 5:
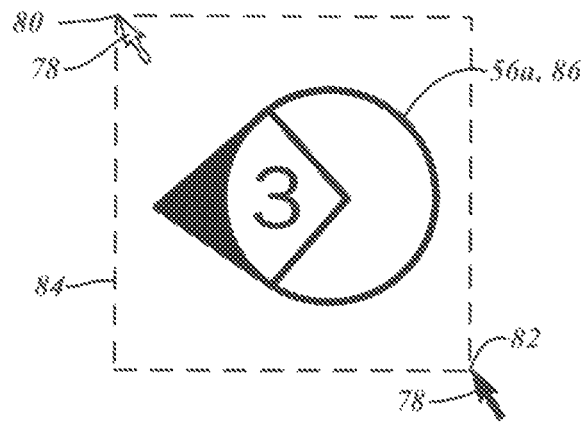
FIG. 5 is a view of the visual object being selected for searching.
Figure 6:
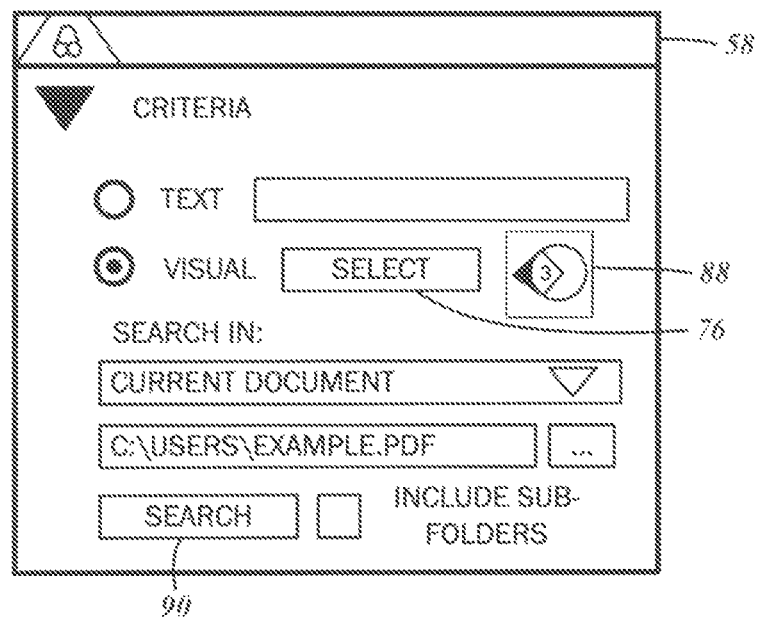
FIG. 6 is a tool panel window of the document editing software application after a template visual object has been selected for searching.

With reference to the flowchart of FIG. 4, the method of computerized searching for the visual objects 56 on the document 54 begins with a step 200 of receiving a selection of a template visual object. In one contemplated embodiment of the document editing software application shown in FIG. 3, this may include activating a select button 76 in the tool panel window 58. Next, as shown in FIG. 5, a cursor 78 may be dragged from a first position 80 to a second position 82, thereby defining a selection area 84 that encompasses the first visual object 56a. Henceforth, this selected first visual object 56a will also be referred to as a template visual object 86. Upon selecting the template visual object 86, as shown in FIG. 6, a template icon 88 is generated next to the select button 76. The template icon 88 is understood to be a representation of the template visual object 86 that was selected previously. While a specific technique in which the template visual object 86 is selected has been described, it will be recognized that there are other techniques that may be utilized as well.

In general, the present disclosure contemplates searching the document 54 to identify visual objects 56 that have the same or substantially similar appearance as the template visual object 86. The search may be invoked upon selecting the template visual object 86, or as shown in FIG. 6, by pressing a search button 90.

Figure 7:
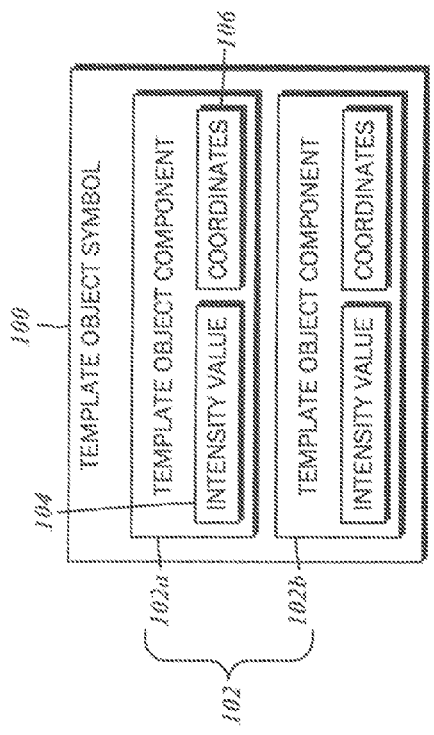
FIG. 7 is a bitmap representation of the visual object shown in FIG. 5 at a first predetermined resolution.

Referring again to the flowchart of FIG. 4 and the bitmap of FIG. 7, the method continues with a step 202 of generating a template raster image 92 from the template visual object 86. The template raster image 92 is represented as an array of pixels 94 that are arranged in rows 96 and columns 98. In some embodiments, the template visual object 86 may be in a vector format in which a constituent set of geometric primitives are mathematically defined. For this template visual object 86, a rasterization process converts such geometric primitives to the bitmap of pixels 94. The template visual object 86 may be rasterized at a first predefined resolution. The pixels 94 are understood to be defined by varying levels of intensities, with those of similar intensities adjacent to each other being grouped into a connected sequence. As referenced herein, a first pixel is connected to a second pixel if the two are immediately adjacent in the upward, downward, leftward, or rightward relation, and has a difference in intensity that is below a predetermined threshold. In this regard, a chain or sequence of connected pixels may be defined. For any given template visual object 86, there may be a set of one or more connected sequences of adjacent pixels.

Figure 8:
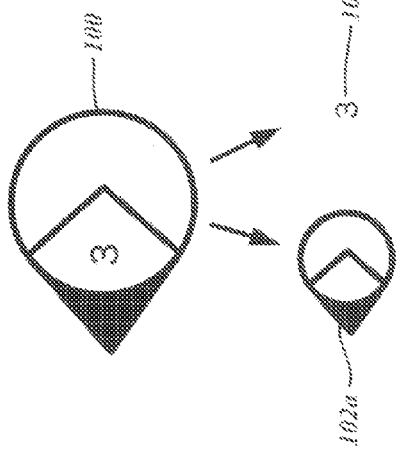
FIG. 8 is diagram illustrating an example data structure of a template object symbol.
Figure 9:
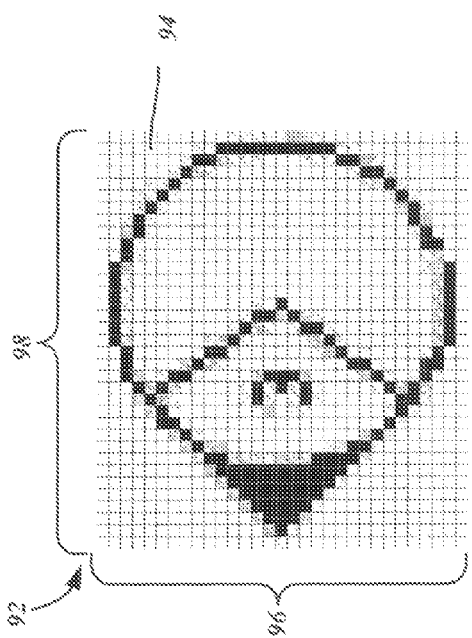
FIG. 9 is an example of the template object symbol being broken down into template object components.

With additional reference to FIG. 8 and FIG. 9, the method continues with a step 204 of deriving a template object symbol 100 from the template raster image 92. The template object symbol 100 is understood to be a structured arrangement of data comprised of one or more template object components 102, which in the illustrated example there are two: a first template object component 102a and a second template object component 102b. As indicated above, the template visual object 86 is comprised of a set of one or more connected sequences of adjacent pixels. These connected sequences of pixels, then, correspond to the template object components 102. Along theses lines, the template object components 102 include an intensity value 104 and a coordinate value 106 of each of the pixels thereof. Therefore, the template object components 102 represent a subsection of the template raster image 92. Visually, as best shown in FIG. 9, the example first template object component 102a is the circle, the arrowhead, and internal divider, as each of these primitives are combined into a single connected sequence of pixels. The second template object component 102b is the text character, which is unconnected from the pixels of the first template object component 102a.

The above-described step of generating a raster image is repeated for the document 54. In further detail as shown in FIG. 4, the method continues with a step 206 of generating a document raster image, which is likewise represented as an array of pixels arranged in rows and columns. Since the specifics of rasterizing an image have been described above in relation to the template visual object 86, the same details in relation to the document 54 will not be repeated here. For the example document 54 shown in FIG. 3, there are multiple sets of one or more connected sequences of adjacent pixels, with each set corresponding to one of the visual objects 56a-56c. Like the template visual object 86, each of the visual objects 56a-56c has several connected sequences of adjacent pixels.

A given one of the visual objects 56 is comprised of a set of one or more connected sequences of adjacent pixels. As referenced herein, the term document object symbol refers to a logical grouping of pixels that may constitute a distinct graphical element or symbol, and not to a specific data structure that is derived from the document 54 and is handled independently thereof. These connected sequences of pixels correspond to document object components, which are understood to represent a subsection of the document raster image, and more generally, of the document 54. Again, the document object components are understood to be an arbitrary grouping of pixels, rather than a specific data construct.

Figure 10:
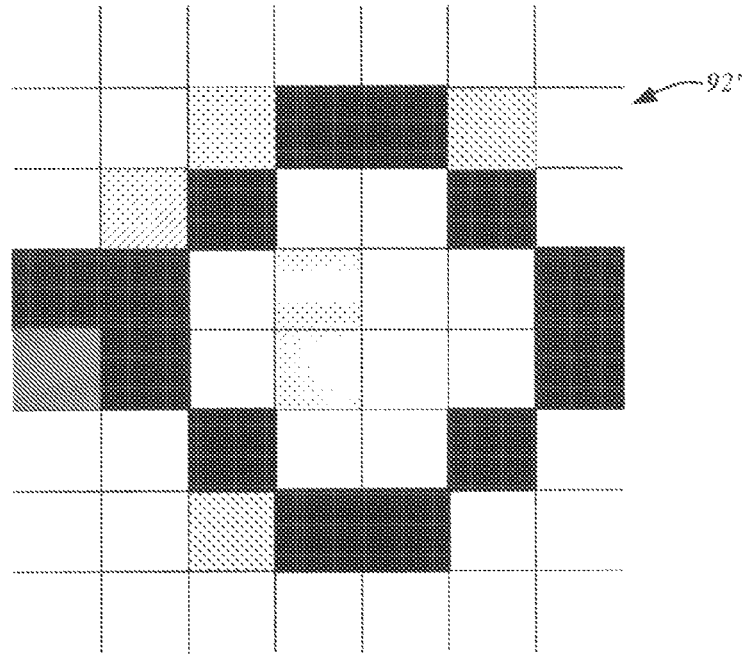
FIG. 10 is a bitmap representation of the visual object shown in FIG. 5 at a second predetermined resolution lower than the first predetermined resolution as shown in FIG. 7.

The template raster image 92 and the document raster image may be downsampled to a second predefined resolution than the first predefined resolution mentioned above. The second predefined resolution can be varied according to a desired balance between accuracy and speed, as a greater resolution requires additional memory and processing resources, while a lower resolution may yield inaccurate matches. FIG. 10 shows one exemplary downsampling of the template raster image 92'. Significant details of the template visual object 86 are lost, but as will be described further below, comparisons to the document object symbols can be greatly improved.

Figure 11:
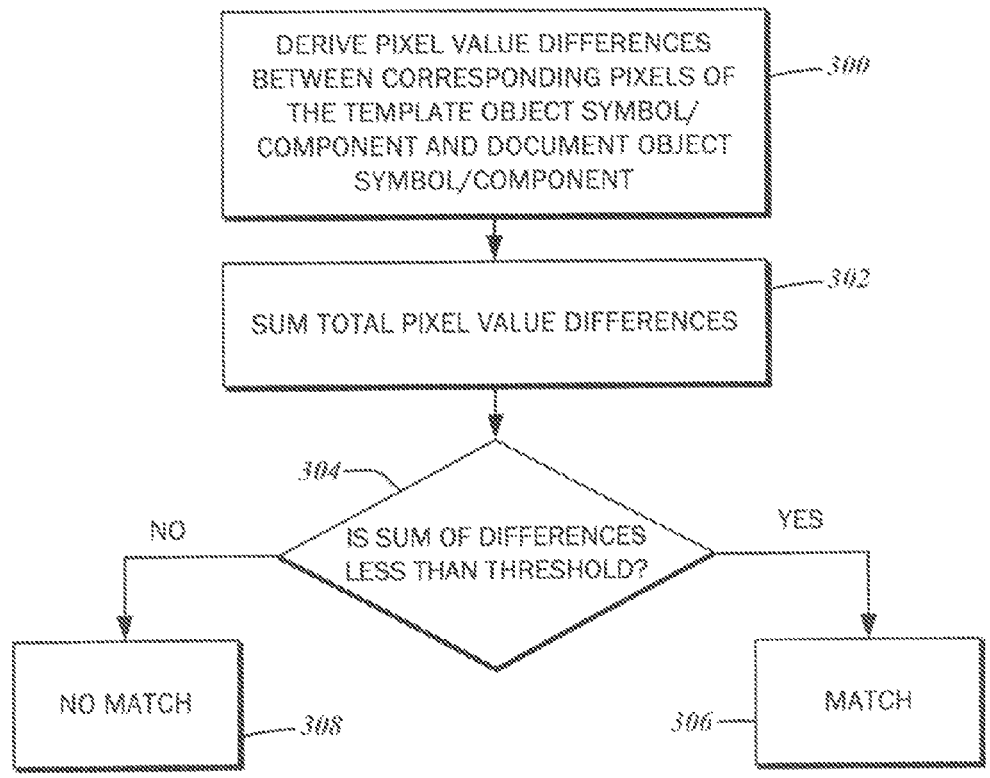
FIG. 11 is a flowchart illustrating the detailed steps involved with comparing the template object symbol to the document object symbol.

Returning to the flowchart of FIG. 4, the method continues with a step 208 of generating a broad match candidate subset of the document object symbols 110 from the document 54. It is contemplated that the template object symbol 100 is compared against the various sequences of pixels in the document raster image. While these comparisons ultimately involve those sequences of pixels that are variously deemed document object symbols and document object components, it is understood that such entities are not pre-identified for this purpose. With further reference to the flowchart of FIG. 11, this comparison may begin with a step 300 of deriving pixel intensity differences between corresponding or identical pixels (with the same coordinates) of the template object symbol 100 and the document object symbol 110.

As mentioned above, the template object symbol 100 is comprised of template object components 102. However, this initial comparison between the template object symbol 100 and the document object symbol 110 may involve the downsampled resolution versions of the entirety of the respective symbols, so it is possible that the components 102 may not yet be needed. In this regard, such components may not yet be derived in accordance with step 204 when the step 208 occurs. It is also contemplated that the broad match candidate subset can be narrowed by comparisons of successively increasing resolutions of the template object symbol 100.

In a step 302, the total pixel intensity value differences for each of the pixels in the downsampled raster images of the template object symbol 100 and the document object symbol 110 are summed. Per decision branch 304, a match is established in step 306 when the sum of the total pixel intensity value differences is below a predetermined limit value or percentage, which in one contemplated embodiment is 5%. This predetermined limit value is understood to be variable or adjustable, so that the sensitivity of the matching can be varied according to the types of visual objects being processed. If the sum of the total pixel intensity value differences is higher than the predetermined limit value, then per step 308, no match is established. As best illustrated in FIG. 3, the tool panel window 58 may include an options sub-panel 75 with a sensitivity slider bar 79 that can be manipulated to set the desired sensitivity level. Although a specific comparison methodology has been described, any other suitable one may be readily substituted.

It will be recognized that results of the comparison between the template object symbol 100 and the document object symbol 110 may vary depending upon the offsets applied in generating its raster image. Accordingly, the presently disclosed method contemplates generating multiple versions of the template raster image 92 and the document raster image, each with a slightly different offset. The above-described comparison is repeated with these different versions of both the template visual object and the document to account for the variance in rasterization. In some embodiments, however, only multiple versions of the template raster image 92 are generated, with the comparisons to a single version of the document 54. Whether to use one variation or another is understood to depend on the processing capabilities and speed requirements of a specific embodiment.

With reference again to FIG. 3, based upon the foregoing steps of generating the broad match candidate subset, the first visual object 56a, the second visual object 56b, and the third visual object 56c may be included in the same. The overall shape of each of these visual objects is similar, with slight variations in the text included therein or with additional exterior features as in the second visual object 56b. The fourth visual object 56d would likely not be deemed matching because of the substantial differences as would be recognized by the comparison steps 300-304.

After the broad match candidate subset is generated, the method continues with a step 210 of generating a narrowed match candidate set of document object symbols 110 from the broad match candidate subset discussed above. As noted earlier, the template object symbol 100 is comprised of one or more template object components 102, and the document object symbols 110 are comprised of document object components 112. The next step in the searching method involves a comparison of the components. The comparison step is similar to the comparison of the template object symbol to the document object symbols 110 described with reference to the flowchart of FIG. 11, except that the pixels of the different components 102, 112 are compared instead. Furthermore, the comparison involves just the document object symbols 110 from the broad match candidate subset, and not the overall set 108. The tolerance or predefined limit value to find a match is substantially reduced though likewise adjustable. In order to achieve consistent results, different rasterized versions of the components 102, 112 are utilized.

A size threshold is also applied to the components 102, 112. If the size proportion between the overall document object symbol 110 and the constituent document object component 112 is more than a predetermined threshold, the pixel-wise comparison is not performed. One implementation contemplates a size threshold of 30%.

Following the step 210 of generating the narrowed match coordinate subset, based upon the foregoing approach, the first visual object 56a and the second visual object 56b would likely be identified as matches to the selected template visual object 86. The second comparison of the document object components 112 is understood to allow the differentiation between the character "3" in the first visual object 56a and the character "8" in the third visual object 56c. Furthermore, because the broad match candidate subset would likely have included the second visual object 56b, and also has the same character component "3," despite there being an additional line extending therefrom, it would also likely be identified as a match.

The above-described method for computerized searching is understood to contemplate generally a multi-pass, component-based searching technique. After identifying a broad or rough set of results, the components of the visual objects 56 are deconstructed, and within those broad set of results, the components are compared. The dominant graphic features of the visual objects 56 are minimized in the secondary search, and can be further refined.

Figure 12:
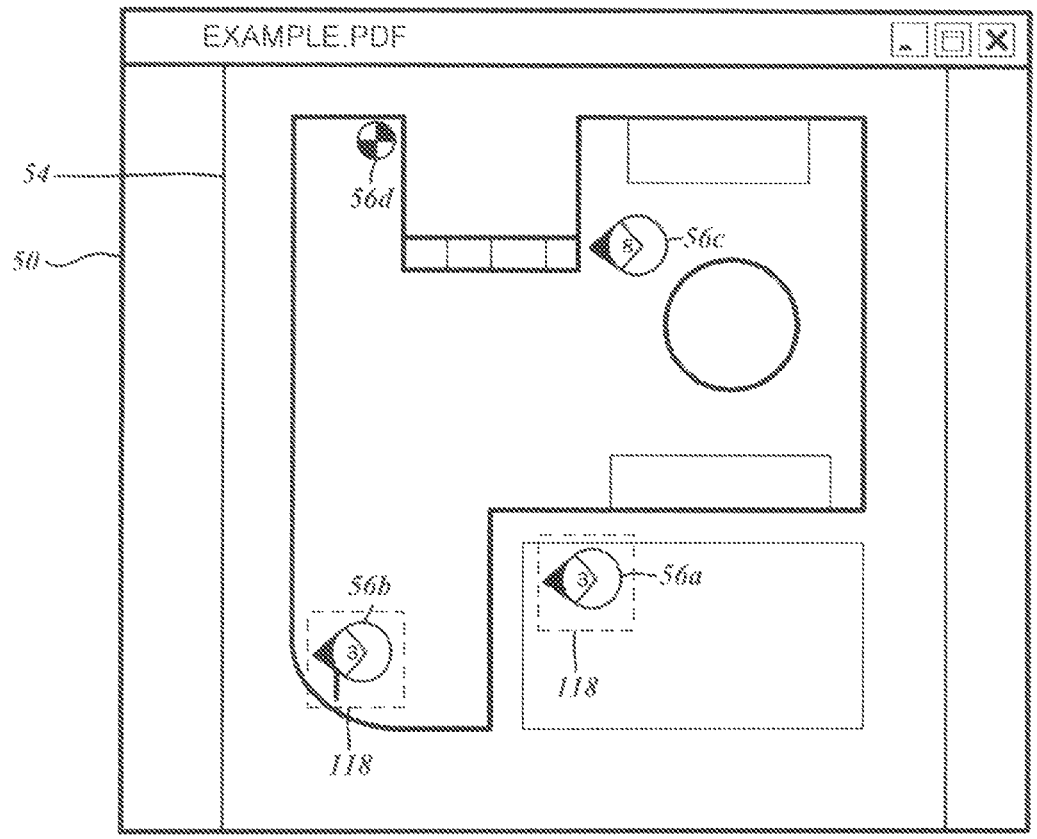
FIG. 12 is the user interface shown with the matched document object symbols being highlighted.

With the matching visual objects 56 identified, the document editing software application can present the results in a multitude of ways. One embodiment shown in FIG. 12 envisions highlighting the visual objects 56 corresponding to the document object symbols 110 in the narrowed match candidate set such as with a shaded box 118 around the first visual object 56a and the second visual object 56b. However, other modalities of emphasizing the matched visual objects 56 may also be employed.

Figure 13:
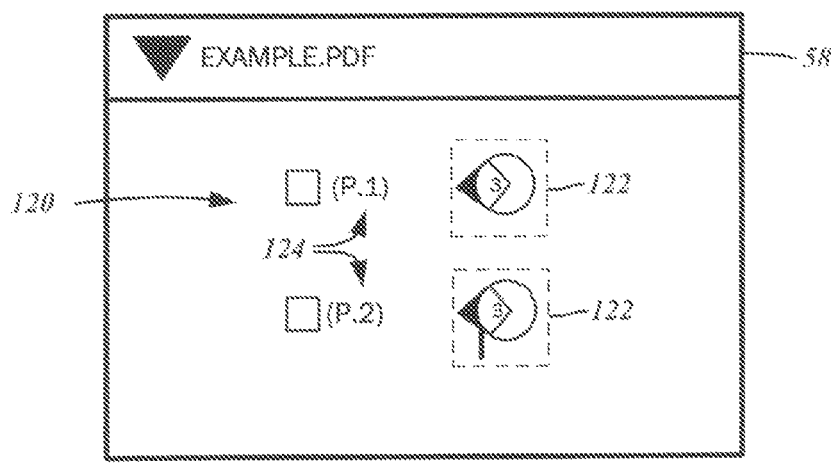
FIG. 13 is one example search result list of visual objects matching the selected criteria or template.

Another embodiment shown in FIG. 13 includes a list 120 of search results with icons 122a, 122b corresponding to the first visual object 56a and the second visual object 56b. The list 120 includes a page number indicator 124. Selecting the icons 122a, 122b is understood to initiate the display of the document 54 being modified to focus on the corresponding first visual object 56a or second visual object 56b, respectively. The focus modification is based upon the position values of the visual objects 56. Different search result presentation modalities may also be substituted, and so the foregoing example is not intended to be limiting.

The particulars shown herein are by way of example and for purposes of illustrative discussion of the embodiments of the present invention only and are presented in the cause of providing what is believed to be the most useful and readily understood description of the principles and conceptual aspects . . . . In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A method of multiple pass, component-based computerized searching for visual objects on an document, the method comprising:

receiving a selection of a template visual object;

generating from the template visual object a template raster image including a set of one or more sequences of adjacent pixels;

deriving a template object symbol from the template raster image, the template object symbol comprised of one or more independent template object components each corresponding to a respective one of the sequences of adjacent pixels of the template raster image and being representative of a subsection thereof, each of the sequences being independent of other sequences;

generating from the document a document raster image including sets of one or more sequences of adjacent pixels, each of the sets corresponding to a document object symbol and each of the sequences of adjacent pixels therein corresponding to a document object component, each of the sequences being independent of the other sequences;

generating in a first pass a broad match candidate subset of document object symbols based upon a first comparison of dominant features of an entirety of the template object symbol to dominant features of the document object symbols in the document raster image; and generating in a second pass a narrowed match candidate set of document object symbols from the broad match candidate subset based upon a second comparison of deconstructed ones of the template object components comprising subsections of the template object symbol to deconstructed ones of the document object components comprising subsections of the corresponding document object symbols of the broad match candidate subset and the dominant features of the document object symbols and of the template object symbol are minimized in the second comparison.

2. The method of claim 1, wherein the template raster image and the document raster image have a first predetermined resolution.

3. The method of claim 2, further comprising:
downsampling the template raster image and the document raster image to a second predetermined resolution lower than the first predetermined resolution, the template object symbol and the first set of document object symbols being derived from the second predetermined resolution version of the respective template raster image and the document raster image.

4. The method of claim 3, wherein the broad match candidate subset of document symbols is narrowed with comparisons of successively increasing predetermined resolutions of the document object symbols.

5. The method of claim 1, wherein a plurality of versions of the template raster image and the document raster image are generated, each version having a different rasterizing offset.

6. The method of claim 5, wherein a plurality of versions of the template object symbol are derived for each of the plurality of versions of the template raster image.

7. The method of claim 6, wherein the broad match candidate subset of document object symbols are generated based upon a comparison of one or more of the plurality of versions of the template object symbol to the respective document object symbols.

8. The method of claim 6, wherein a plurality of versions of the document object symbols are derived for each of the plurality of versions of the document raster image.

9. The method of claim 8, wherein the broad match candidate subset of document object symbols are generated based upon a comparison of one or more of the plurality of versions of the template object symbol to one or more of the plurality of versions of the document object symbols.

10. The method of claim 1, wherein a plurality of versions of the document object symbols are derived for each of the plurality of versions of the document raster image.

11. The method of claim 10, wherein the broad match candidate subset of document object symbols are generated based upon the first comparison of the template object symbol to one or more of the plurality of versions of the document object symbols.

12. The method of claim 1, wherein the first comparison of the template object symbol to the document object symbols includes:
deriving pixel value differences between corresponding pixels of the template object symbol and a one of the document object symbols; and
summing the total pixel value differences;
wherein a match is established with the sum of total pixel value differences being below a predetermined limit value.

13. The method of claim 12, wherein the predetermined limit value is adjustable.

14. The method of claim 1, wherein a proportion of the one of the document object symbols and the one of the document object components is less than a predetermined threshold.

15. The method of claim 1, wherein the second comparison of the deconstructed ones of the template object component to the deconstructed ones of the document object components includes:
deriving pixel value differences between corresponding pixels of the template object component and a one of the document object components; and
summing the total pixel value differences;
wherein a match is established with the sum of total pixel value differences being below a predetermined limit value.

16. The method of claim 15, wherein the predetermined limit value is adjustable.

17. The method of claim 1, further comprising:
highlighting one or more visual objects on the document corresponding to the narrowed match candidate set of document object symbols.

18. The method of claim 1, further comprising:
displaying the document on a display device;
wherein the visual objects each have a specific position value corresponding to its relative position on the document.

19. The method of claim 18, further comprising:
generating a list of search results including user-selectable links for each of the document object symbols of the narrowed match candidate set, the display of the document being modified to focus on the selected one of the visual objects based upon its position value.

20. An article of manufacture comprising a non-transitory program storage medium readable by a data processing apparatus, the medium tangibly embodying one or more programs of instructions executable by the data processing apparatus to perform a method of multiple pass, component-based computerized searching for visual objects on an document, the method comprising:
receiving a selection of a template visual object;
generating from the template visual object a template raster image including a set of one or more sequences of adjacent pixels;
deriving a template object symbol from the template raster image, the template object symbol comprised of one or more independent template object components each corresponding to a respective one of the sequences of adjacent pixels of the template raster image and being representative of a subsection thereof, each of the sequences being independent of other sequences;
generating from the document a document raster image including sets of one or more sequences of adjacent pixels, each of the sets corresponding to a document object symbol and each of the sequences of adjacent pixels therein corresponding to a document object component, each of the sequences being independent of the other sequences;
generating a broad match candidate subset of document object symbols based upon a first comparison of dominant features of an entirety of the template object symbol to dominant features of the document object symbols in the document raster image; and
generating a narrowed match candidate set of document object symbols from the broad match candidate subset based upon a second comparison of deconstructed ones of the template object components comprising subsections of the template object symbol to deconstructed ones of the document object components comprising subsections of the corresponding document object symbols of the broad match candidate subset and the dominant features of the document object symbols and of the template object symbol are minimized in the second comparison.

\* \* \* \* \*